United States Patent [19]

Boveia

[11] 4,182,506

[45] Jan. 8, 1980

[54] LOAD-LEVELING BASE

[75] Inventor: Clark E. Boveia, Little Rock, Ark.

[73] Assignee: Clark-Way Leveling Systems, Inc., Benton, Ark.

[21] Appl. No.: 885,891

[22] Filed: Mar. 13, 1978

[51] Int. Cl.² ............................................. F16M 13/00
[52] U.S. Cl. ........................................ 248/656; 248/651
[58] Field of Search ............... 248/23, 11, 180, 188.2, 248/346

[56] References Cited

U.S. PATENT DOCUMENTS

| | | | |
|---|---|---|---|
| 434,011 | 8/1890 | Wrigley | 248/23 |
| 1,112,935 | 10/1914 | Rial et al. | 248/180 |
| 2,965,783 | 11/1954 | Serafin | 248/346 X |
| 3,018,992 | 1/1962 | Lore | 248/180 |
| 3,239,169 | 3/1966 | Sloyan | 248/23 |
| 3,424,413 | 1/1969 | Applegate | 248/23 |
| 3,712,573 | 1/1973 | Pickles | 248/394 |

FOREIGN PATENT DOCUMENTS 1299053 6/1962 France ................................. 248/346

OTHER PUBLICATIONS

*Product Engineering*, Jan. 16, 1961, p. 73, Duff–Norton Advertisement.

*Primary Examiner*—William H. Schultz
*Attorney, Agent, or Firm*—Huebner & Worrel

[57] ABSTRACT

A base characterized by a substantially horizontally oriented plate adapted to receive a load, a vertically oriented post disposed beneath the central portion of the plate supporting the plate for pivotal motion about a plurality of horizontally oriented axes lying in the plane of the plate, and a pair of jack screws spaced ninety degrees apart and connected to peripheral portions of the plate, and a power train for selectively driving the jack screw, each independently of the other, for tilting the plate to achieve a leveling of a load supported thereby.

1 Claim, 6 Drawing Figures

LOAD-LEVELING BASE

BACKGROUND OF THE INVENTION

1. Field of the Invention

The invention generally relates to devices for supporting loads and more particularly to a load-leveling base for supporting an adjustably positioned load such as a refrigerator of the type frequently employed in trailers, campers, motor homes, recreational vehicles and the like.

2. Description of the Prior Art

As can be appreciated by those familiar with the design, fabrication and use of absorption refrigerators, liquid coolant circulated therethrough percolates to the top and then gravitates to the bottom of the cooling coil. If the refrigerator is not maintained in a leveled disposition percolation may be interrupted whereupon the cooling unit may sustain permanent damage. Hence, it is highly desirable that refrigerators of the absorption type be maintained in a leveled disposition throughout their operation.

Of course, maintenance of a leveled disposition for a refrigerator within a recreational vehicle, such as a trailer, camper, motor home or the like often is achieved by first leveling the refrigerator in relation to the vehicle and thereafter leveling the vehicle upon parking. Because of the vehicles inherent mobility, operators frequently are burdened with a relatively difficult task since leveling of the vehicle is required upon each parking in order to assure that the refrigerator contained therein oriented in a properly leveled disposition. Hence, the utility of recreational vehicles of the aforementioned type tends to be impaired because of the time required to achieve a leveling of the vehicle, following each use thereof.

It is, therefore, the general purpose of the instant invention to provide an improved load supporting base adapted to be installed in recreational vehicles and employed for rapidly leveling and supporting loads such as absorption-type refrigerators, which is simple in design, economic to fabricate and practical to use.

OBJECTS AND SUMMARY OF THE INVENTION

It is an object of the instant invention to provide an improved base for leveling loads.

It is another object to provide an improved base for a load adapted to be reoriented relative to the horizontal plane employing an adjustable three-point support.

It is another object to provide an improved base including a base adapted to be selectively pivoted about intersecting horizontal axes for supporting a load in an adjustably leveled orientation.

It is another object to provide an improved pivotal support plate particularly suited for use in supporting in leveled orientation an absorption-type refrigerator, although not necessarily limited in use thereto since the improved base of the instant invention has utility when employed in supporting loads of general utility.

These and other objects and advantages will become more readily apparent by reference to the following description and claims in light of the accompanying drawings.

DESCRIPTION OF THE PREFERRED EMBODIMENT

Figure 1:
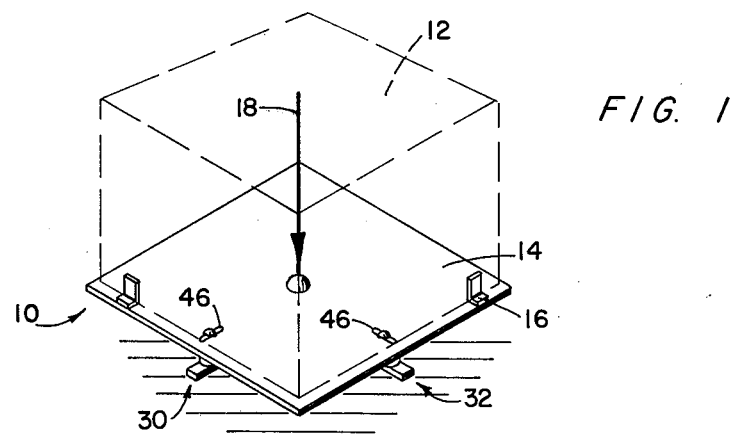
FIG. 1 is a perspective view of a base embodying the principles of the instant invention.

Referring now with more particularity to the drawings, wherein like reference characters designate like or corresponding parts throughout the several views, there is shown in FIG. 1 a base, generally designated 10, which embodies the principles of the instant invention.

It is to be understood that as herein disclosed the utility of the base 10 relates to the leveling and supporting of a refrigerator, designated 12, of a type commonly employed in recreational vehicles such as campers, trailers, motor homes and the like. However, it is to be understood that the base 10 has utility separate and apart from refrigerators for reasons which will hereinafter become more readily apparent.

The base 10 includes a plate 14 of a substantially planar configuration suitably dimensioned for receiving a load, such as the refrigerator 12. Since the size of the plate 14 is varied depending upon the size and configuration of the load to be supported thereby, it will be appreciated that the particular dimensions of the plate 14 are varied as desired.

Where desired, suitable stops 16 are mounted on the plate and employed for maintaining the load in proper orientation relative to the upper surface of the plate 14. While, as a practical matter, the stops 16 may take the form of right angle support brackets, as illustrated in the drawings, it is to be understood that the load supported by the plate is so positioned that the center of its mass lies along a load axis perpendicularly related to the plate 14 and passes substantially through its center.

Aligned in coaxial alignment with the load axis 18 there is a center post assembly 20 having a longitudinal axis coincident with the load axis 18. The center post assembly 20 includes an upright a post comprising pedestal 22 having affixed to its upper end a ball 24 seated within a bearing socket 26. The configuration of the socket 26, in practice, conforms to that of an inverted cup and is seated in an opening, not designated, formed in the center of the plate 14. The socket 26 is affixed to the plate 14 in any suitable manner, as by welding or the like, while the ball 24 is secured within the socket 26 through the use of a retainer clip, designated 28, extended through suitably formed openings, not designated.

It is to be understood that the ball 24 functions as a bearing surface for supporting the plate 14 for omnidirectional pivotal motion about axes passing horizontally through the ball, while the retainer clip 28 serves to secure the ball in place relative to the socket 26. Moreover, it is to be understood that the plane of the upper surface of the plate 14 lies beneath the center of the ball 24.

Figure 4:
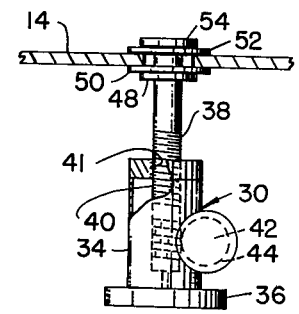
FIG. 4 is a fragmentary view depicting the jack screw employed in leveling the plate.

Spaced about the periphery of the plate 14 there is a pair of jack screw assemblies 30 and 32. These assemblies preferably are double-acting assemblies spaced 90° apart and cooperate with the center post spaced to provide a three-point support for the plate 14. Since the jack screw assemblies 30 and 32 are of a common design and perform similar functions, a detailed description of a single one of the jack screws is deemed adequate to provide for a complete understanding of the instant invention. Therefore, attention is invited to FIG. 4 wherein is disclosed the jack screw 30.

The jack screw 30, as a practical matter, is of a simple and convenient design which forms no specific part of the instant invention. The purpose of the jack screw is simply to raise and lower the edge portion of the plate 14 to which it is attached. Therefore, the construction is varied as desired. As shown, however, the jack screw assembly includes a cylindrical housing 34 mounted on a base 36 and having extended vertically therefrom a screw 38. The screw 38 is provided with a thread 40 extended along its effective length. The housing 34 is closed by a cover plate, not designated, having defined therein an internally threaded bore, designated 41. The thread of the bore is mated with the thread 40 so that axial motion attends rotary motion imparted to the screw 38.

In order to impart rotary motion to the screw 38 there is provided a screw 42 commonly referred to as a worm, having a helical rib 44 extended along its surface thereof meshed with an array of teeth, not designated, circumscribing the screw 38. The particular manner in which the teeth are related to the screw 38 forms no part of the instant invention. However, for illustrative purposes, it is to be understood that the teeth may comprise a circular array circumscribing a nut mated with the screw and supported against axial displacement or, where so desired, the teeth may comprise a helical array extended along the surface of the screw for receiving the worm 44. The screw 42 is connected to a power train, hereinafter more fully described, provided for driving the worm for purposes of imparting axial motion to the screw 38.

The upper end portion of the screw 38 passes through a slotted opening 46, defined in an edge portion of the plate 14, having an axis passing through the center of the ball 24. The length and width of the slotted opening 46 is varied as desired. However, it is to be understood that the length is sufficient to accommodate a tilting of the plate 14.

Mounted on the screw 38, beneath the lower surface of the plate 14, there is a collar 48 which serves as a support for an annular bearing 50 upon which the lower surface of the plate 14 rests. Above the upper surface of the slot 46 there is provided an annular bearing 52 through which extends the shaft of the screw 38. As a practical matter, the upper end of the shaft is capped by a suitable plate 54, which may be welded in place if so desired. In any event, it is to be understood that as axial motion is imparted to the screw 38 the bearings 50 and 52 engage opposite surfaces of the plate 14 and displace the plate upwardly or downwardly as determined by the direction in which the screw 38 is axially advanced in response to rotary motion imparted thereto.

Figure 2:
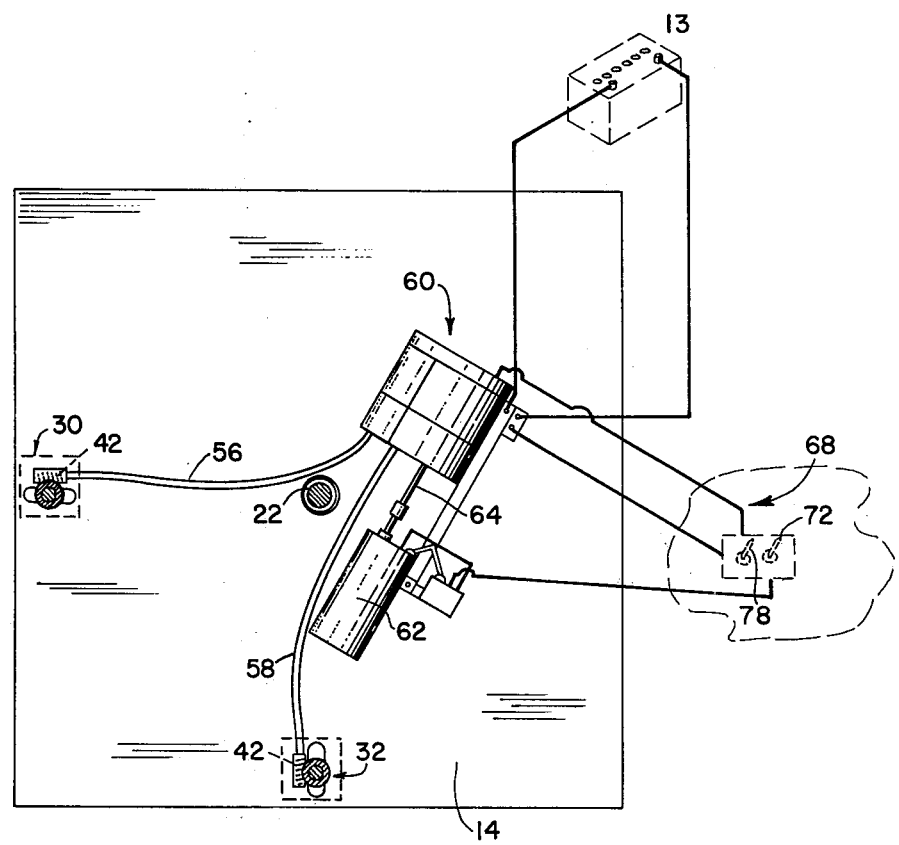
FIG. 2 is a partially sectioned, partially diagrammatic, bottom plan view of the base shown in FIG. 1 depicting a power train and electrical circuitry provided therefor.
Figure 3:
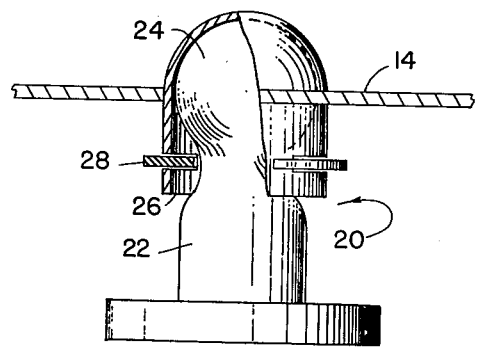
FIG. 3 is a fragmented, side elevational view of a center post for the base shown in FIG. 1.

Referring now to FIG. 2, it can be seen that to the screw 42, for the jack screw 30, connected a flexible drive shaft 56, while for the jack screw 32 there is connected to the screw 42 a flexible drive shaft 58. The drive shafts 56 and 58 extend to a transmission, generally designated 60, also of suitable design. The transmission 60 selectively serves to couple the drive shafts 56 and 58 with an electrically energizable motor 62. The transmission 60 is of any suitable design and, preferably, includes a driven gear, not shown, connected to each of the drive shafts 56 and 58 and a driver, also not shown. The driven gears are selectively connected to a driver mounted on the output shaft 64 through an idler. As a practical matter, the driver, where desired, is displaced in response to a selective energization of a solenoid, designated 66, FIGS. 5 and 6, in any suitable manner. Since the details of the transmission form no part of the invention, a detailed description thereof is omitted. In any event, it is to be understood that at any given time one of the drive shafts 56 and 58 is connected to the motor 62 through the transmission 60 and that a coupling of the drive shaft with the motor is achieved in response to a selective operation of the solenoid 66.

Moreover, the motor 62 preferably comprises a reversible d.c. (direct current) motor, having an instantaneous direction of rotation dictated by the polarity of the electrical potential applied thereacross. Since such motors are well known, a detailed description of the motor 62 is omitted in the interest of brevity. However, it should be understood that the motor 62 is connected through a suitable circuit 68 with a source of electrical potential comprising a d.c. battery B. In practice, the battery B comprises twelve volt d.c. battery of the type commonly found aboard recreational vehicles.

Figure 5:
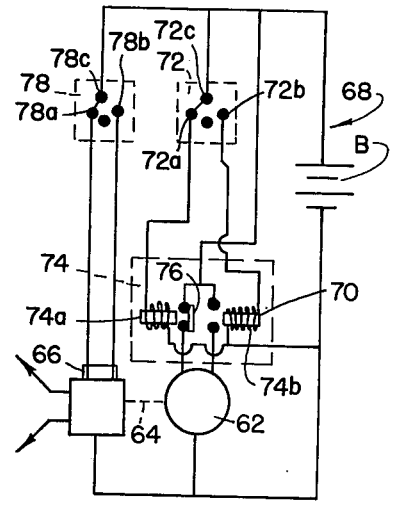
FIG. 5 is a schematic view of a simplified circuit employed in controlling the power train shown in FIG. 2.

Turning now to FIG. 5, it can be seen that the circuit 68 includes a switching relay 70 the purpose of which is to connect the battery B across selected windings of the motor 62. The operation of the relay 70 is controlled by a suitable switch 72 which functions to energize one or the other of a pair of solenoid windings 74a and 74b for purposes of displacing a shorting bar 76. In any event, it is to be understood that when the shorting bar of the relay is in a first position one set of windings of the motor 62 are energized for driving the output shaft 64 of the motor 62 in a first direction, and when the shorting bar is in its alternate position the other windings of the motor are energized for driving the output shaft 64 in an opposite direction. Hence, the drive shaft, 56 or 58, then connected with the output shaft 64 is driven in a direction determined by the position of the shorting bar 76. Of course, the position of the shorting bar 76 is dictated by the position of the shorting bar, not designated, provided for the switch 72.

As aforementioned, the drive shaft 56 or 58 to be driven at any given time is determined by operation of the solenoid 66. The solenoid 66 is controlled through a switch 78. The switch 78 includes contacts 78a and 78b connectable with the battery B via a shorting bar, not designated, pivotally connected to contact 78c. Consequently, depending upon the position of the shorting bar the solenoid 66 is suitably energized by "shifting" the transmission 60 for coupling one or the other of the drive shafts 56 and 58 with the output shaft 64. Consequently, depending upon which drive shaft is connected with the output shaft for the motor 62 one of the jack screws 30 and 32 is driven for pivotally displacing the plate 14.

Figure 6:
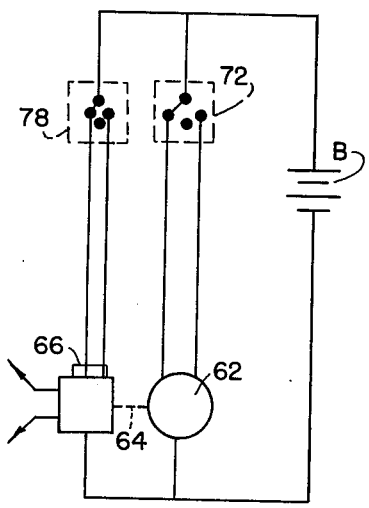
FIG. 6 is a schematic view illustrating a modification of the circuitry shown in FIG. 5.

The circuit shown in FIG. 6 is similar in many respects to the circuit shown in FIG. 5 excepting, however, that the relay 74 has been omitted from the circuit.

Hence, the circuit shown in FIG. 6 is of increased simplicity but lacks the inherent safety characteristics which attend the use of a relay.

OPERATION

It is believed that in view of the foregoing description, the operation of the device is readily understood, however, in the interest of completeness, it will be reviewed at this point.

The base 10 having deposited thereon a load, such as a refrigerator 12, is "leveled" simply by selectively manipulating the switches 72 and 78. Assuming for a moment that the jack screw 30 is to be operated for raising the edge portion of the plate 14, the switch 78 is manipulated in a suitable direction for causing the solenoid to "shift" the transmission 60 for coupling the flexible drive shaft 56 to the output shaft 64 for the motor 62. The motor 62 is then energized by repositioning the bridging bar of the switch 72 for connecting the battery B across a selected set of windings for the motor 62. The windings of the motor 62, upon being thus energized, impart unidirectional rotation to the output shaft 64, the direction being determined by the position of the bridging bar 76 for the relay for thus driving the flexible drive shaft 56 connected thereto.

Of course, as rotary motion is imparted to the drive shaft 56 the screw 38 is rotated in response to driven rotation of the screw 42. Thus, the edge portion of the plate 14 connected to the screw 38 at the slot 46, is displaced for tilting the plate about an axis passing through the ball 24.

Similarly, the plate 14 is pivoted about another axis simply by manipulating the switch 78 for "shifting" the transmission 60 in order to couple the drive shaft 58 with the output shaft 64 of the motor 62 and manipulating the switch 72 to energize appropriate windings for causing the motor 62 to drive the output shaft 64 in a selected direction causing the screw 38 of the jack screw 32 to advance in the required direction.

In view of the foregoing, it can be seen that the plate 14 is supported by a three-point support which facilitates a leveling of the plate 14, through selective operation of the jack screws, in order to level a refrigerator 12, or similar load, relative to a horizontal plane in an expeditious manner, where a leveling of the refrigerator 12 is achieved, without regard to the "leveled" disposition of the vehicle within which the refrigerator is situated.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An improved base for supporting a leveled load comprising:
A. a horizontally oriented plate having an upper surface adapted to receive in supporting relation a load characterized by a center of mass substantially centrally related to the plate;
B. support means for supporting said plate for oscillatory motion about a pair of normally related pivotal axes intersecting a vertically oriented load axis passing through the center of the plate including a vertically oriented load-bearing post surmounted by an integrally related ball and characterized by a longitudinal axis coincident with said load axis, means defining in the center of said plate an inverted socket concentrically related to said load axis receiving the ball in mated relation, and means defining a keeper for securing said ball in said socket;
C. means for pivotally displacing said plate about a selected one of said pivotal axes, while simultaneously supporting said plate against pivotal displacement about the other pivotal axis of said pair, including one pair of jack screws spaced 90° apart about the longitudinal axis of said post, each of the jack screws being characterized by a vertically oriented jack screw shaft having a linear axis extended into intersecting relation with one pivotal axis of the pair of pivotal axes, means connecting the upper end of each of said jack screw shafts with said plate, and drive means for axially displacing the jack screw shafts, each independently of the other, including a pair of worms connected in driving relation with the jack screw shafts, and means for driving said worms in rotation, each independently of the other, including an electrically energizable motor, a flexible drive shaft connected to each worm of said pair of worms, and transmission means for selectively connecting each drive shaft of said pair of drive shafts to said motor; and
D. means including an electrical circuit for selectively energizing said motor.

* * * * *